United States Patent
Wu et al.

(10) Patent No.: US 8,912,759 B2
(45) Date of Patent: Dec. 16, 2014

(54) POWER SUPPLY SYSTEM WITH VARIABLE SUPPLY VOLTAGE

(75) Inventors: Te-Lung Wu, New Taipei (TW); Yin-Yu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 385 days.

(21) Appl. No.: 13/467,053

(22) Filed: May 9, 2012

(65) Prior Publication Data

US 2012/0299385 A1 Nov. 29, 2012

(30) Foreign Application Priority Data

May 27, 2011 (TW) .............................. 100118706 A

(51) Int. Cl.
| | |
|---|---|
| *H02J 1/10* | (2006.01) |
| *H02J 7/02* | (2006.01) |
| *H02J 9/06* | (2006.01) |
| *H02J 7/34* | (2006.01) |

(52) U.S. Cl.
CPC ... *H02J 7/02* (2013.01); *H02J 9/06* (2013.01); *H02J 1/10* (2013.01); *H02J 7/34* (2013.01)
USPC ............ 320/128; 320/106; 320/114; 320/138

(58) Field of Classification Search
CPC ... H02J 7/0068; H02J 2007/0096; H02J 7/02; H02J 1/00; Y02E 60/12; H01M 10/44; H02M 3/33507
USPC .................................. 320/106, 114, 128, 138
See application file for complete search history.

(56) References Cited

U.S. PATENT DOCUMENTS

| | | | | |
|---|---|---|---|---|
| 5,150,032 | A | * | 9/1992 | Ho ................................ 320/130 |
| 6,075,345 | A | * | 6/2000 | Lee ................................ 320/138 |
| 7,221,391 | B2 | * | 5/2007 | Yamagishi ................ 348/222.1 |
| 7,646,168 | B2 | | 1/2010 | Tseng et al. |
| 7,688,037 | B2 | * | 3/2010 | Huh ................................ 320/138 |
| 8,482,260 | B2 | * | 7/2013 | Hsieh et al. .................... 320/138 |
| 8,519,671 | B2 | * | 8/2013 | Bao et al. ....................... 320/128 |
| 8,653,789 | B2 | * | 2/2014 | Chen et al. ..................... 320/111 |
| 2006/0082344 | A1 | * | 4/2006 | Lai et al. ........................ 320/128 |
| 2006/0152192 | A1 | * | 7/2006 | Lee et al. ....................... 320/106 |
| 2006/0277420 | A1 | | 12/2006 | Nguyen | |

(Continued)

FOREIGN PATENT DOCUMENTS

| | | |
|---|---|---|
| CN | 101478171 | 7/2009 |
| CN | 201742121 | 2/2011 |

(Continued)

OTHER PUBLICATIONS

"Office Action of China Counterpart Application", issued on Feb. 27, 2014, p. 1-p. 14.

(Continued)

*Primary Examiner* — Sun Lin
(74) *Attorney, Agent, or Firm* — Jianq Chyun IP Office

(57) ABSTRACT

A power supply system with a variable supply voltage is provided. The power supply system includes a power adaptor, a battery unit, a switching circuit, and a main equipment. The power adaptor is suitable for producing a power voltage. The switching circuit selects the power adaptor or the battery unit for powering the main equipment. Wherein, the power adaptor adjusts the power voltage according to whether the battery unit performs a charge operation.

19 Claims, 3 Drawing Sheets

(56) References Cited

U.S. PATENT DOCUMENTS

| | | |
|---|---|---|
| 2007/0115902 A1 | 5/2007 | Shamoon et al. |
| 2007/0159136 A1* | 7/2007 | Culbert et al. ............... 320/128 |
| 2008/0010514 A1 | 1/2008 | Liu |
| 2009/0309426 A1* | 12/2009 | Hsieh et al. .................. 307/113 |

FOREIGN PATENT DOCUMENTS

| | | |
|---|---|---|
| CN | 102013705 | 4/2011 |
| TW | 200613952 | 5/2006 |
| TW | 200705160 | 2/2007 |
| TW | 200705162 | 2/2007 |
| TW | 200801918 | 1/2008 |

OTHER PUBLICATIONS

"Office Action of Taiwan Counterpart Application" with English translation thereof, issued on Jan. 7, 2014, p. 1-p. 7.

* cited by examiner

POWER SUPPLY SYSTEM WITH VARIABLE SUPPLY VOLTAGE

CROSS-REFERENCE TO RELATED APPLICATION

This application claims the priority benefit of Taiwan application serial no. 100118706, filed on May 27, 2011. The entirety of the above-mentioned patent application is hereby incorporated by reference herein and made a part of this specification.

BACKGROUND OF THE DISCLOSURE

1. Field of the Disclosure

The disclosure relates to a power supply technique. Particularly, the disclosure relates to a power supply system with a variable supply voltage.

2. Description of Related Art

With development of technology, electronic products with various functions are gradually developed, and the electronic products with various functions not only satisfy diverse needs of people, but are also widely used in people's daily life and make people's life more convenient.

FIG. 1 is a circuit block diagram of an existing power supply system. Referring to FIG. 1, the power supply system 100 includes a power adaptor 110, a switching circuit 120, a charger 130, a battery set 140 and a main equipment 150. The power adaptor 110 generates a power voltage Vin. The power voltage Vin can be supplied to the main equipment 150 and/or can charge the battery set 140 through the charger 130. The power supply system 100 selects the power adaptor 110 or the battery set 140 for powering the main equipment 150 through the switching circuit 120. Therefore, the switching 120 can provide a supply voltage Vdcb for supplying power to various DC/DC transformation units in the main equipment 150. For example, a DC/DC transformation unit 154 outputs a core voltage Vcore and supplies the core voltage Vcore to a central processing unit (CPU) for utilization. A DC/DC transformation unit 152 outputs a 1.5V voltage to a chipset, and a DC/DC transformation unit 156 outputs a 3.3V voltage to a keyboard controller.

The power voltage Vin generated by the power adaptor 110 is a fixed voltage. In order to match a charging voltage level required by the battery set 140 and the charger 130, the fixed power voltage Vin has to be higher than the charging voltage level. Generally, the power voltage Vin generated by the power adaptor 110 is 19V. When the switching circuit 120 selects the power adaptor 110 for powering the main equipment 150, the supply voltage Vdcb of the switching circuit 120 is also 19V. Since voltage differences between inputs and outputs of the DC/DC transformation units 152-156 in the main equipment 150 are relatively great, power conversion efficiency is not ideal. For example, the power voltage Vin is 19V, so that the supply voltage Vdcb is also about 19V, and the voltage differences between inputs and outputs of the DC/DC transformation units 152 and 156 are respectively 17.5V and 15.5V. Generally the DC/DC transformation units 152-156 respectively have a buck structure, and when the voltage difference of the buck DC/DC transformation unit is excessively large, the power conversion efficiency is not good.

Generally, when the power conversion efficiency is improved according to the conventional technique, an advanced power adaptor is used to achieve higher power conversion efficiency. However, the design of the advanced power adaptor may greatly increase fabrication cost.

The power adaptor is generally used in the electronic products, and energy loss is inevitable after multiple conversions of the supply power. Many countries in the world participate in the Energy Star project promoted by U.S. Environmental Protection Agency. The Energy Star project is an energy conservation project for consumable electronic products, and a purpose thereof is to reduce energy consumption. Therefore, the electronic products manufactured by manufactures have to satisfy certain specifications in order to label an Energy Star tag thereon.

Since the power voltage Vin of the power converter 110 is a fixed voltage and cannot be decreased, it is of no avail for power management of the whole system. Therefore, it is an important issue to develop an adjustable power voltage to achieve a power supply system with a variable supply voltage to reduce energy loss during the power conversion process.

SUMMARY OF THE DISCLOSURE

The disclosure is directed to a power supply system with a variable supply voltage. The power supply system is unnecessary to use an advanced power adaptor, and a power voltage of a power adaptor is adjustable according to a novel power management mechanism. The supply voltage is accordingly changed according to the adjusted power voltage, so as to reduce a power conversion loss.

The disclosure provides a power supply system including a power adaptor, a battery unit, a switching circuit, and a main equipment. The power adaptor is used for producing a power voltage. The switching circuit is coupled to the main equipment, the power adaptor and the battery unit. The switching circuit selects the power adaptor or the battery unit for powering the main equipment. The power adaptor adjusts the power voltage according to whether the battery unit performs a charge operation.

In an embodiment of the disclosure, the battery unit stops the charge operation according to a disable signal sent by the main equipment, and the battery unit sends a command signal, and the power adaptor adjusts the power voltage according to the command signal In an embodiment of the disclosure, the power adaptor includes a demodulator, an alternating current (AC)/direct current (DC) transformation unit and a first microprocessor. The demodulator receives and transfers the command signal. The AC/DC transformation unit generates the power voltage. The first microprocessor is coupled to the demodulator and the AC/DC transformation unit, and controls an operation of the AC/DC transformation unit, where the first microprocessor adjusts the power voltage according to the command signal.

In an embodiment of the disclosure, the battery unit includes a battery set and a charger. The charger is coupled to the power adaptor, the switching circuit, the main equipment and the battery set, where the charger stops charging the battery set according to the disable signal, and the charger sends the command signal to the power adaptor.

In an embodiment of the disclosure, the charger includes a modulator and a second microprocessor.

The modulator is coupled to the power adaptor and the switching circuit. The second microprocessor is coupled to the modulator, where when the second microprocessor receives the disable signal, it stops the charging operation of the battery set, and controls the modulator to send the command signal.

In an embodiment of the disclosure, when the power voltage is decreased, a minimum value of the power voltage is greater than a maximum value of an output voltage of the battery set.

In an embodiment of the disclosure, the command signal is transmitted to the power adaptor through a power line between the power adaptor and the switching circuit.

In an embodiment of the disclosure, the power voltage of the power adaptor is transmitted to the switching circuit through the power line.

In an embodiment of the disclosure, the main equipment includes a controller. The controller is coupled to the battery unit, and is used for sending the disable signal.

In an embodiment of the disclosure, the controller transmits the disable signal to the battery unit through an I²C data line.

In an embodiment of the disclosure, the main equipment further includes at least one DC/DC transformation unit. An input terminal of the at least one DC/DC transformation unit is coupled to an output terminal of the switching circuit.

In an embodiment of the disclosure, the battery unit stops the charging operation according to a disable signal sent by the main equipment, and the main equipment sends a command signal, and the power adaptor adjusts the power voltage according to the command signal, where the supply voltage is accordingly changed according to the adjusted power voltage.

In an embodiment of the disclosure, the power adaptor includes a radio frequency (RF) receiver, an AC/DC transformation unit and a first microprocessor. The RF receiver receives and transfers the command signal. The AC/DC transformation unit generates the power voltage. The first microprocessor is coupled to the RF receiver and the AC/DC transformation unit, and controls an operation of the AC/DC transformation unit, where the first microprocessor adjusts the power voltage according to the command signal.

In an embodiment of the disclosure, the battery unit includes a battery set and a charger. The charger is coupled to the switching circuit, the main equipment and the battery set, where the charger stops charging the battery set according to the disable signal.

In an embodiment of the disclosure, when the power voltage is decreased, a minimum value of the power voltage is greater than a maximum value of an output voltage of the battery set.

In an embodiment of the disclosure, the main equipment sends the command signal through a wireless manner.

In an embodiment of the disclosure, the wireless manner between the main equipment and the power adaptor comprises an infrared protocol, a bluetooth protocol or a wireless fidelity (Wi-Fi) protocol.

In an embodiment of the disclosure, the main equipment includes a RF transmitter and a controller. The RF transmitter is used for sending the command signal. The controller is coupled to the battery unit and the RF transmitter, and is used for controlling an operation of the RF transmitter and sending the disable signal.

In an embodiment of the disclosure, the controller transmits the disable signal to the battery unit through an I²C data line.

In an embodiment of the disclosure, the main equipment further includes at least one DC/DC transformation unit. An input terminal of the at least one DC/DC transformation unit is coupled to an output terminal of the switching circuit.

According to the above descriptions, in the power supply system with the variable supply voltage of the disclosure, the charging operation of the battery unit is stopped in response to a disable signal sent by the main equipment, and then a command signal is sent to control the power adaptor to adjust the power voltage. In this way, the supply voltage is accordingly changed according to the adjusted power voltage. Therefore, the power supply system can effectively reduce a power conversion loss.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
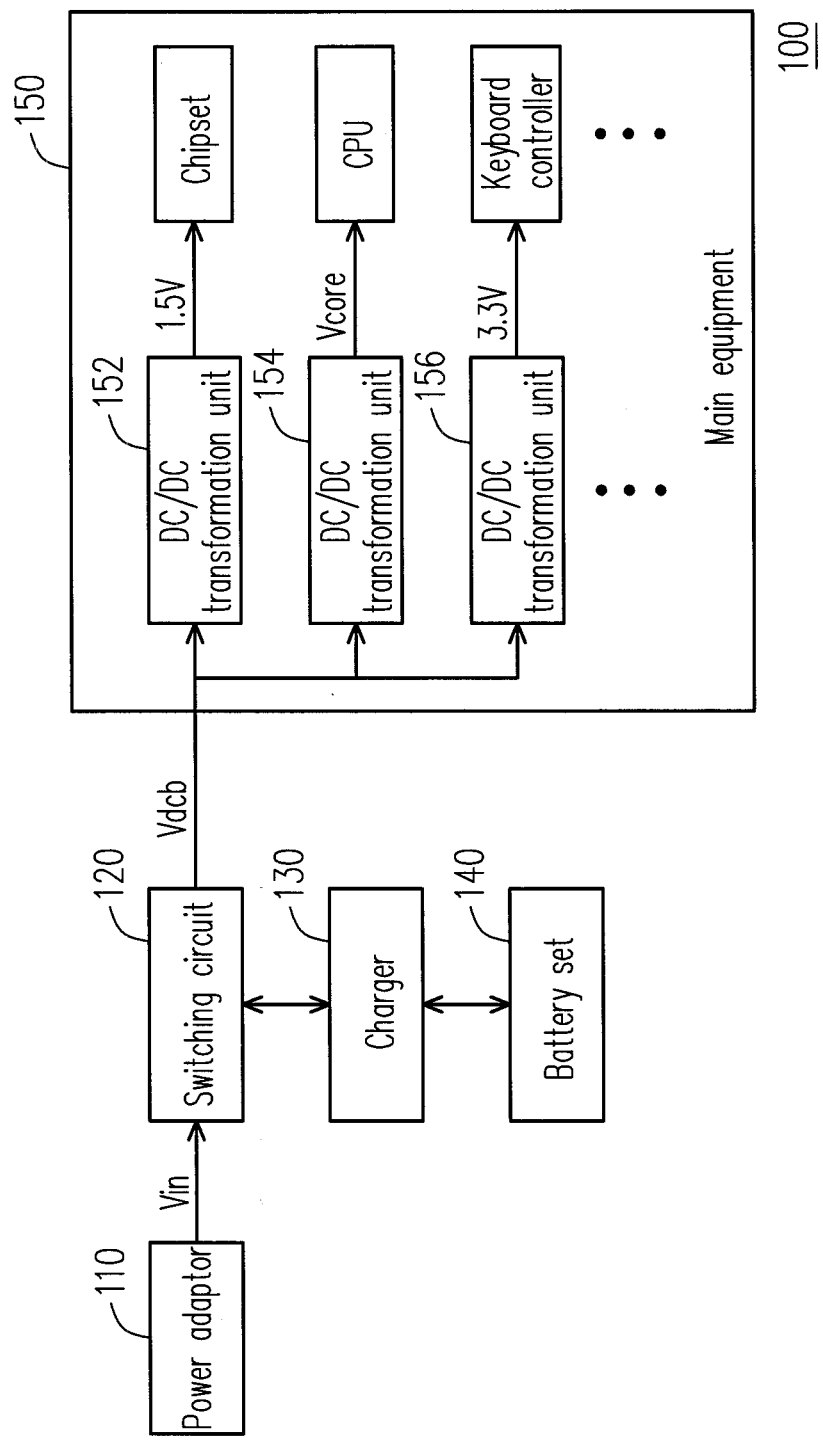
FIG. 1 is a circuit block diagram of an existing power supply system.

Reference will now be made in detail to the present preferred embodiments of the disclosure, examples of which are illustrated in the accompanying drawings. Wherever possible, the same reference numbers are used in the drawings and the description to refer to the same or like parts.

In the following embodiments, when "A" device is referred to be "connected" or "coupled" to "B" device, the "A" device can be directly connected or coupled to the "B" device, or other devices probably exist there between. Comparatively, when the "A" device is referred to be "directly connected" or "directly coupled" to the "B" device, none other device exits there between.

Figure 2:
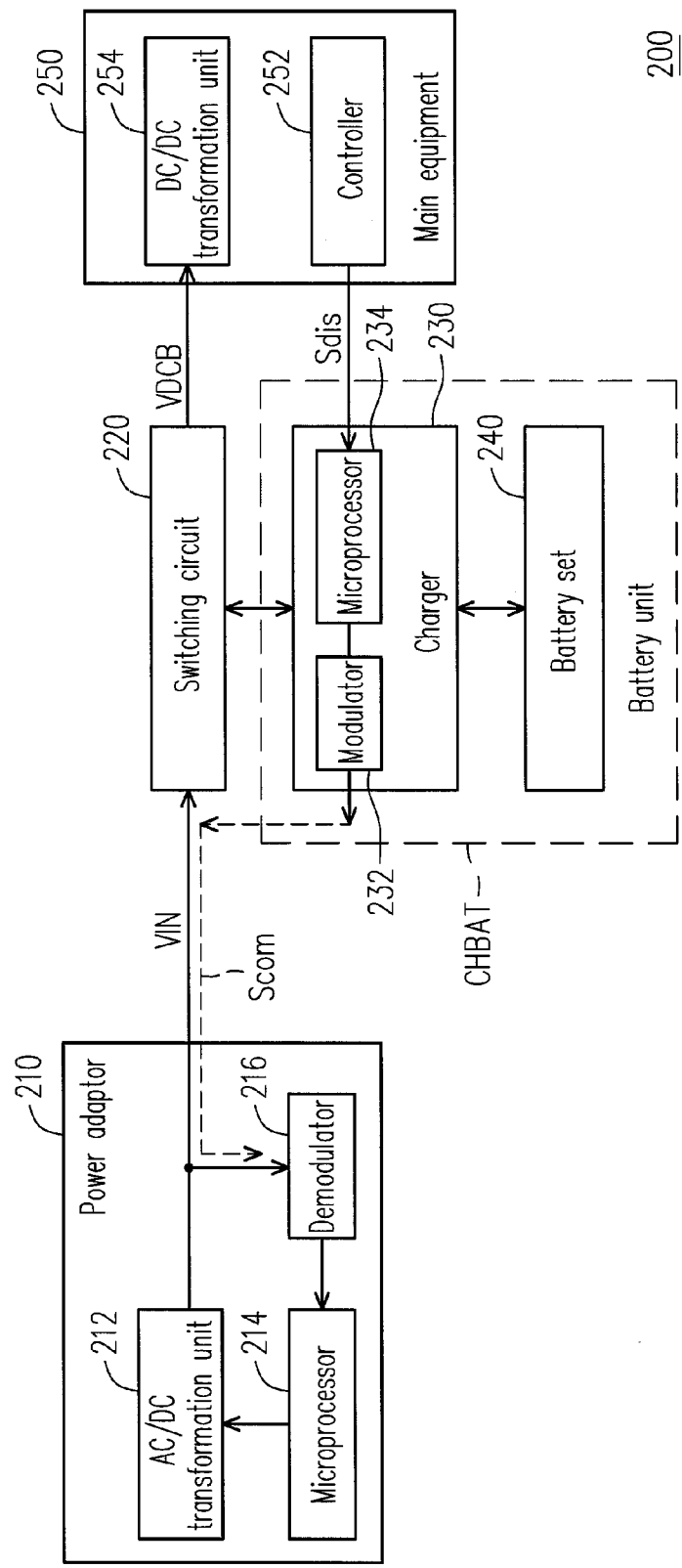
FIG. 2 is a circuit block diagram of a power supply system according to an embodiment of the disclosure.

FIG. 2 is a circuit block diagram of a power supply system according to an embodiment of the disclosure. Referring to FIG. 2, the power supply system 200 includes a power adaptor 210, a battery unit CHBAT, a switching circuit 220, and a main equipment 250. The battery unit CHBAT can be coupled to the power adaptor 210, the switching circuit 220 and the main equipment 250. The switching circuit 220 can be coupled to the power converter 210 and the main equipment 250.

The power adaptor 210 may have a function of adjusting a power voltage VIN. The switching circuit 220 can switch a power source and selects the power adaptor 210 or the battery unit CHBAT for powering the main equipment 250. The power adaptor 210 correspondingly adjusts the power voltage VIN according to whether the battery unit CHBAT performs a charge operation.

For example, when the power voltage VIN exists, a supply voltage VDCB provided by the switching circuit 220 is equal to the power voltage VIN, and the power voltage VIN is provided to the battery unit CHBAT for charging. When the power voltage VIN does not exist, the battery unit CHBAT can be used for supplying power, and now the supply voltage VDCB is equal to an output voltage of the battery unit CHBAT. Then, the main equipment 250 receives and uses the supply voltage VDCB.

In case that the power voltage VIN exists in the power supply system 200, the battery unit CHBAT stops the charging operation according to a disable signal Sdis sent by the main equipment 250. A time point for sending the disable signal Sdis can be a moment when the main equipment 250 is unnecessary to charge the battery unit CHBAT according to a power management plan, or when the main equipment 250 detects that a certain operation requires a large amount of electric energy and disables the charging operation of the battery unit CHBAT.

Then, the battery unit CHBAT sends a command signal Scom to the power adaptor 210 according to the disable signal Sdis. The power adaptor 210 adjusts the power voltage VIN according to the command signal Scom.

For example, it is assumed that when the battery unit CHBAT is used for supplying power, the output voltage thereof is 12.6V, though a value of the output voltage of the battery unit CAHBAT is not limited thereto. In the power supply system 200, in case that the power voltage VIN exists, the power voltage VIN of the power adaptor 210 can charge the battery unit CHBAT while supplying power to the main equipment 250 through the switching circuit 220. During a period of charging the battery unit CHBAT, the power adaptor 210 can adjusts the power voltage VIN to 19V. In case that the battery unit CHBAT stops the charging operation according to the disable signal Sdis sent by the main equipment 250, the power adaptor 210 can adjust the power voltage VIN from 19V to 13V according to the command signal Scom, namely, the supply voltage VDCB is adjusted from 19V to 13V. Since the supply voltage VDCB is decreased, an input voltage of a post-end DC/DC transformation unit 254 is obviously decreased by 6V. Therefore, a voltage difference between the input and the output of the DC/DC transformation unit 254 can be decreased, so that power conversion efficiency of the DC/DC transformation unit 254 is improved.

For another example, it is assumed that when the battery unit CHBAT is used for supplying power, the output voltage thereof is 16.8V. In case that the power voltage VIN exists, and the battery unit CHBAT stops the charging operation according to the disable signal Sdis sent by the main equipment 250, the power adaptor 210 can adjust the power voltage VIN from 19V to 17V. However, the above embodiment is only used to describe the concept of the disclosure, which is not used to limit an actual application of the disclosure.

It should be noticed that the adjusted power voltage VIN is required to be slightly higher than the output voltage of the battery unit CHBAT. According to such adjustment mechanism, a minimum value of the power voltage VIN is greater than a maximum value of the output voltage of the battery unit CHBAT, by which besides the power conversion efficiency is effectively improved, discharging of the battery unit CHBAT due to misjudgement of the switching circuit 220 can be avoided.

Referring to FIG. 2, the power adaptor 210 may include a demodulator 216, an AC/DC transformation unit 212 and a microprocessor 214. The AC/DC transformation unit 212 is coupled to the demodulator 216 and the microprocessor 214. The AC/DC transformation unit 212 is used for transforming a commercial electricity into a direct current to generate the power voltage VIN. The demodulator 216 receives and transfers the command signal Scom. The microprocessor 214 controls an operation of the AC/DC transformation unit 212, where the microprocessor 214 adjusts the power voltage VIN according to the command signal Scom.

It should be noticed that the command signal Scom sent by the battery unit CHBAT can be transmitted to the power adaptor 210 through a power line between the power adaptor 210 and the switching circuit 220 that is used for transmitting the power voltage VIN. The technique that the command signal Scom is transmitted to the demodulator 216 through the power line is belonged to a "signal on power line" technique, which should be well known by those skilled in the art, so that a detailed description thereof is omitted. However, the disclosure is not limited thereto.

The battery unit CHBAT may include a charger 230 and a battery set 240. The charger 230 is coupled to the power adaptor 210, the switching circuit 220, the battery set 240 and the main equipment 250, where the charger 230 stops charging the battery set 240 according to the disable signal Sdis, and the charger 230 sends the command signal Scom to the power adaptor 210.

Moreover, the charger 230 may include a modulator 232 and a microprocessor 234. The modulator 232 is coupled to the power adaptor 210 and the switching circuit 220. The microprocessor 234 is coupled to the modulator 232, where when the microprocessor 234 receives the disable signal Sdis, it stops the charging operation of the battery set 240, and controls the modulator 232 to send the command signal Scom.

It should be noticed that an $I^2C$ data line can be connected between the microprocessor 234 and the main equipment 250, the $I^2C$ is an internal integrated circuit which is well known by those skilled in the art, so that a detailed description thereof is omitted. The main equipment 250 can transmit the disable signal Sdis to the microprocessor 234 through the $I^2C$ data line, though the disclosure is not limited thereto.

The main equipment 250 may include a controller 252 and at least one DC/DC transformation unit 254. The at least one DC/DC transformation unit 254 can be used to transform a voltage level of the supply voltage VDCB. For example, an output voltage of the DC/DC transformation unit 254 can be a 1.5V voltage supplied to a chipset, a core voltage supplied to a central processing unit (CPU), or a 3.3V voltage supplied to a keyboard controller, though the disclosure is not limited thereto, and other voltage values are also applicable.

Moreover, the controller 252 can be coupled to the charger 230 of the battery unit CHBAT, or coupled to the microprocessor 234. The controller 252 is used for sending the disable signal Sdis. The controller 252 can be a south bridge controller, an embed controller or a keyboard controller, which is not limited by the disclosure.

Although several possible patterns of the power supply system 200 have been described in the above embodiment, it should be understood by those skilled in the art that the design of the power supply system 200 varies with manufacturers, thus, application of the present disclosure should not be limited to the possible patterns. In other words, the spirit of the present disclosure is met as long as the charging operation of the battery unit CHBAT is stopped according to the disable signal Sdis sent by the main equipment 250, and the power adaptor 210 correspondingly adjusts the power voltage VIN according to whether the battery unit CHBAT performs the charge operation. Several embodiments are provided below to further convey the spirit of the disclosure to those skilled in the art.

Figure 3:
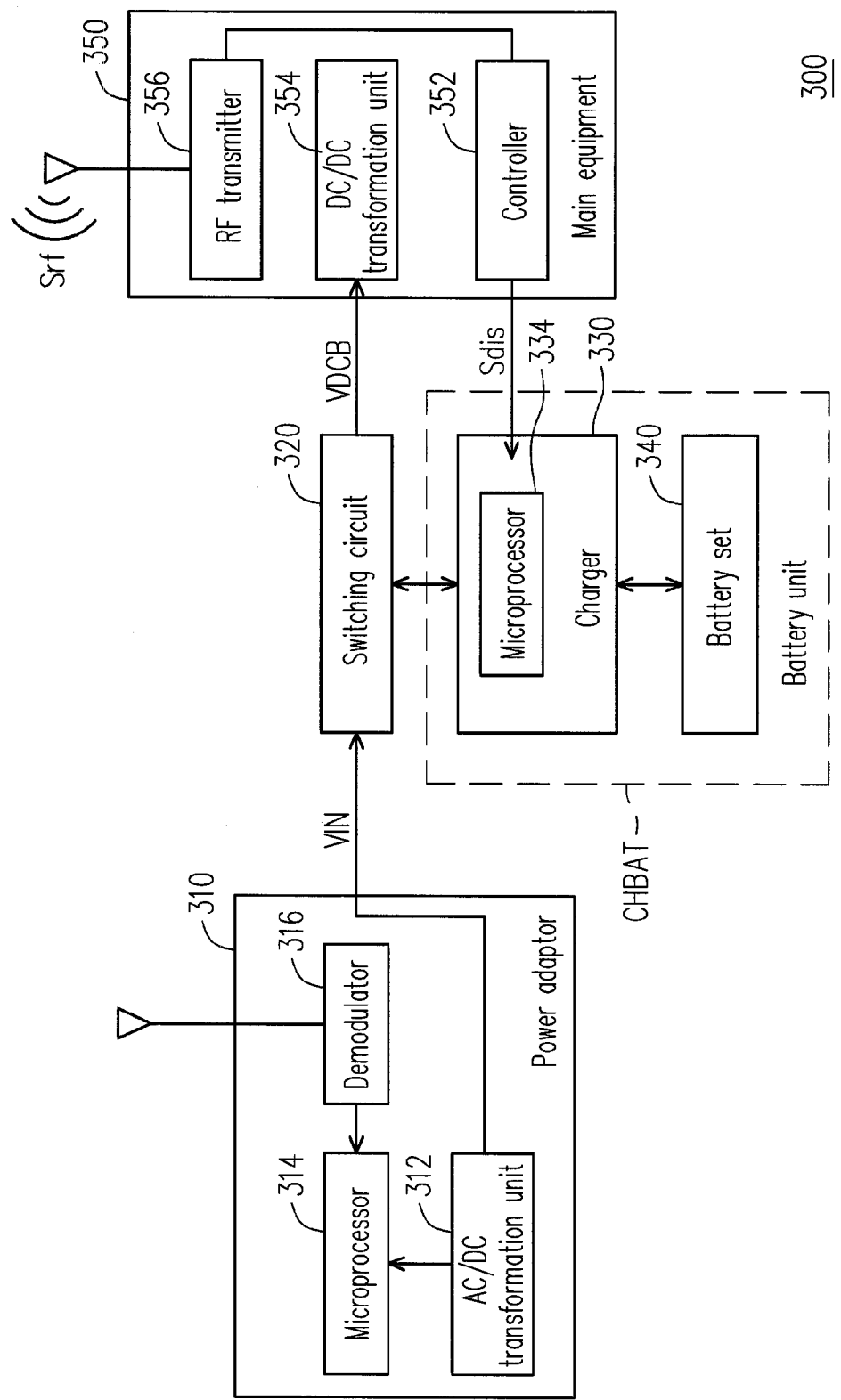
FIG. 3 is a circuit block diagram of a power supply system according to another embodiment of the disclosure.

FIG. 3 is a circuit block diagram of a power supply system 300 according to another embodiment of the disclosure. Related descriptions of the embodiment of FIG. 2 can be referred for descriptions of the embodiment of FIG. 3. Referring to FIG. 3, the power supply system 300 includes a power adaptor 310, a battery unit CHBAT, a switching circuit 320 and a main equipment 350. The battery unit CHBAT can be coupled to the power adaptor 310, the switching circuit 320 and the main equipment 350. The switching circuit 320 can be coupled to the power adaptor 310, the battery unit CHBAT and the main equipment 350.

The power adaptor 310 may have a function of adjusting a power voltage VIN. The switching circuit 320 can switch power sources for supplying power. For example, when the power voltage VIN exists, a supply voltage VDCB provided by the switching circuit 320 is equal to the power voltage VIN, and the power voltage VIN is provided to the battery unit CHBAT for charging. When the power voltage VIN does not exist, the battery unit CHBAT can be used for supplying power, and now the supply voltage VDCB is equal to an output voltage of the battery unit CHBAT. Then, the main equipment 350 receives and uses the supply voltage VDCB.

In case that the power voltage VIN exists in the power supply system 300, the battery unit CHBAT stops the charging operation according to a disable signal Sdis sent by the main equipment 350. A time point for sending the disable signal Sdis can be a moment when the main equipment 350 is unnecessary to charge the battery unit CHBAT according to a power management plan, or when the main equipment 350 detects that a certain operation requires a large amount of electric energy and disables the charging operation of the battery unit CHBAT.

Then, the main equipment 350 sends a command signal Srf to the power adaptor 310, and the power adaptor 310 adjusts the power voltage VIN according to the command signal Srf. Moreover, the supply voltage VDCB can be accordingly changed according to the adjusted power voltage VIN.

For example, it is assumed that when the battery unit CHBAT is used for supplying power, the output voltage thereof is 12.6V, though a value of the output voltage of the battery unit CAHBAT is not limited thereto. In the power supply system 300, in case that the power voltage VIN exists, the power voltage VIN of the power adaptor 310 can charge the battery unit CHBAT while supplying power to the main equipment 350 through the switching circuit 320. During a period of charging the battery unit CHBAT, the power adaptor 310 can adjusts the power voltage VIN to 19V. In case that the battery unit CHBAT stops the charging operation according to the disable signal Sdis sent by the main equipment 350, the power adaptor 310 can adjust the power voltage VIN from 19V to 13V according to the command signal Srf, namely, the supply voltage VDCB is adjusted from 19V to 13V. Since the supply voltage VDCB is decreased, an input voltage of a post-end DC/DC transformation unit 354 is obviously decreased by 6V. Therefore, a voltage difference between the input and the output of the DC/DC transformation unit 354 can be decreased, so that power conversion efficiency of the DC/DC transformation unit 354 is improved.

For another example, it is assumed that when the battery unit CHBAT is used for supplying power, the output voltage thereof is 16.8V. In case that the power voltage VIN exists, and the battery unit CHBAT stops the charging operation according to the disable signal Sdis sent by the main equipment 350, the power adaptor 310 can adjust the power voltage VIN from 19V to 17V. However, the above embodiment is only used to describe the concept of the disclosure, which is not used to limit an actual application of the disclosure.

It should be noticed that the adjusted power voltage VIN is required to be slightly higher than the output voltage of the battery unit CHBAT. According to such adjustment mechanism, a minimum value of the power voltage VIN is greater than a maximum value of the output voltage of the battery unit CHBAT, by which besides the power conversion efficiency is effectively improved, discharging of the battery unit CHBAT due to misjudgement of the switching circuit 320 can be avoided.

Referring to FIG. 3, the power adaptor 310 may include a radio frequency (RF) receiver 316, an AC/DC transformation unit 312 and a microprocessor 314. The AC/DC transformation unit 312 is coupled to the microprocessor 314. The AC/DC transformation unit 312 is used for transforming a commercial electricity into a direct current to generate the power voltage VIN. The RF receiver 316 receives and transfers the command signal Srf. The microprocessor 314 controls an operation of the AC/DC transformation unit 312, where the microprocessor 314 adjusts the power voltage VIN according to the command signal Srf.

It should be noticed that the main equipment 350 sends the command signal Srf in a wireless manner. The wireless manner between the main equipment 350 and the power adaptor 310 comprises an infrared protocol, a bluetooth protocol or a wireless fidelity (Wi-Fi) protocol. It should be noticed that the disclosure is not limited thereto, and other types of wireless transmission protocols can also be applied.

The battery unit CHBAT may include a charger 330 and a battery set 340. The charger 330 is coupled to the power adaptor 310, the switching circuit 320, the battery set 340 and the main equipment 350, where the charger 330 stops charging the battery set 340 according to the disable signal Sdis. Moreover, the charger 330 may include a microprocessor 334. When the microprocessor 334 receives the disable signal Sdis, it stops the charging operation of the battery set 340.

It should be noticed that an $I^2C$ data line can be connected between the microprocessor 334 and the main equipment 350, the $I^2C$ is an internal integrated circuit which is well known by those skilled in the art, so that a detailed description thereof is omitted. The main equipment 350 can transmit the disable signal Sdis to the microprocessor 334 through the $I^2C$ data line, though the disclosure is not limited thereto.

The main equipment 350 may include a controller 352, at least one DC/DC transformation unit 354 and a RF transmitter 356. The at least one DC/DC transformation unit 354 can be used to transform a voltage level of the supply voltage VDCB. For example, an output voltage of the DC/DC transformation unit 354 can be a 1.5V voltage supplied to a chipset, a core voltage supplied to a CPU, or a 3.3V voltage supplied to a keyboard controller, though the disclosure is not limited thereto, and other voltage values are also applicable.

Moreover, the controller 352 can be coupled to the charger 330 of the battery unit CHBAT, or coupled to the microprocessor 334. The controller 352 is used for controlling an operation of the RF transmitter 356 and sending the disable signal Sdis. The controller 352 can be a south bridge controller, an embed controller or a keyboard controller, which is not limited by the disclosure. The controller 352 can send the command signal Srf to the power adaptor 310 through the RF transmitter 356.

In summary, in the power supply system, the charging operation of the battery unit is stopped in response to a disable signal sent by the main equipment, and the power adaptor correspondingly adjusts the power voltage according to whether the battery unit performs the charging operation. Therefore, the power supply system can effectively reduce a power conversion loss.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A power supply system, comprising:
   a main equipment;
   a power adaptor for producing a power voltage;
   a battery unit, wherein the battery unit stops the charge operation according to a disable signal sent by the main equipment, and the battery unit sends a command signal, and the power adaptor adjusts the power voltage according to the command signal; and
   a switching circuit, coupled to the main equipment, the power adaptor and the battery unit, for selecting the power adaptor or the battery unit to power the main equipment;
   wherein the power adaptor adjusts the power voltage according to whether the battery unit performs a charge operation.

2. The power supply system as claimed in claim 1, wherein the power adaptor comprises:
   a demodulator for receiving and transferring the command signal;
   an alternating current (AC)/direct current (DC) transformation unit for generating the power voltage; and
   a first microprocessor, coupled to the demodulator and the AC/DC transformation unit, for controlling an operation of the AC/DC transformation unit, wherein the first microprocessor adjusts the power voltage according to the command signal.

3. The power supply system as claimed in claim 1, wherein the battery unit comprises:
   a battery set; and
   a charger, coupled to the power adaptor, the switching circuit, the main equipment and the battery set, wherein the charger stops charging the battery set according to the disable signal, and sends the command signal to the power adaptor.

4. The power supply system as claimed in claim 3, wherein the charger comprises:
   a modulator, coupled to the power adaptor and the switching circuit; and
   a second microprocessor, coupled to the modulator, wherein when the second microprocessor receives the disable signal, it stops the charging operation of the battery set, and controls the modulator to send the command signal.

5. The power supply system as claimed in claim 3, wherein when the power voltage is decreased, a minimum value of the power voltage is greater than a maximum value of an output voltage of the battery set.

6. The power supply system as claimed in claim 1, wherein the command signal is transmitted to the power adaptor through a power line between the power adaptor and the switching circuit.

7. The power supply system as claimed in claim 6, wherein the power voltage of the power adaptor is transmitted to the switching circuit through the power line.

8. The power supply system as claimed in claim 1, wherein the main equipment comprises:
   a controller, coupled to the battery unit, for sending the disable signal.

9. The power supply system as claimed in claim 8, wherein the controller transmits the disable signal to the battery unit through an I2C data line.

10. The power supply system as claimed in claim 8, wherein the main equipment further comprises:
    at least one DC/DC transformation unit, having an input terminal coupled to an output terminal of the switching circuit.

11. A power supply system, comprising:
    a main equipment;
    a power adaptor, for producing a power voltage;
    a battery unit, wherein the battery unit stops the charging operation according to a disable signal sent by the main equipment, the main equipment sends a command signal, and the power adaptor adjusts the power voltage according to the command signal; and
    a switching circuit, couples to the main equipment, the power adaptor and the battery unit, for selecting the power adaptor or the battery unit to power the main equipment,
    wherein the power adaptor adjusts the power voltage according to whether the battery unit performs a charge operation.

12. The power supply system as claimed in claim 11, wherein the power adaptor comprises:
    a radio frequency (RF) receiver for receiving and transferring the command signal;
    an AC/DC transformation unit for generating the power voltage; and
    a first microprocessor, coupled to the RF receiver and the AC/DC transformation unit, for controlling an operation of the AC/DC transformation unit, wherein the first microprocessor adjusts the power voltage according to the command signal.

13. The power supply system as claimed in claim 11, wherein the battery unit comprises:
    a battery set; and
    a charger, coupled to the switching circuit, the main equipment and the battery set, wherein the charger stops charging the battery set according to the disable signal.

14. The power supply system as claimed in claim 13, wherein when the power voltage is decreased, a minimum value of the power voltage is greater than a maximum value of an output voltage of the battery set.

15. The power supply system as claimed in claim 11, wherein the main equipment sends the command signal through a wireless manner.

16. The power supply system as claimed in claim 15, wherein the wireless manner between the main equipment and the power adaptor comprises an infrared protocol, a bluetooth protocol or a wireless fidelity (Wi-Fi) protocol.

17. The power supply system as claimed in claim 11, wherein the main equipment comprises:
    a RF transmitter for sending the command signal; and
    a controller, coupled to the battery unit and the RF transmitter, for controlling an operation of the RF transmitter, and sending the disable signal.

18. The power supply system as claimed in claim 17, wherein the controller transmits the disable signal to the battery unit through an I2C data line.

19. The power supply system as claimed in claim 17, wherein the main equipment further comprises:
    at least one DC/DC transformation unit having an input terminal coupled to an output terminal of the switching circuit.

* * * * *